(12) United States Patent
Refsum (10) Patent No.: US 9,493,179 B2
(45) Date of Patent: Nov. 15, 2016

(54) TROLLEY

(75) Inventor: Bjørn Refsum, Alesund (NO)

(73) Assignee: Stokke AS (NO)

( * ) Notice: Subject to any disclaimer, the term of this patent is extended or adjusted under 35 U.S.C. 154(b) by 2543 days.

(21) Appl. No.: 10/493,652

(22) PCT Filed: Oct. 22, 2002

(86) PCT No.: PCT/NO02/00382
§ 371 (c)(1),
(2), (4) Date: Aug. 19, 2005

(87) PCT Pub. No.: WO03/035448
PCT Pub. Date: May 1, 2003

(65) Prior Publication Data
US 2006/0001226 A1    Jan. 5, 2006

(30) Foreign Application Priority Data

Oct. 22, 2001 (NO) .................................. 20015159

(51) Int. Cl.
| | |
|---|---|
| B62B 7/00 | (2006.01) |
| B62B 9/26 | (2006.01) |
| B62B 1/00 | (2006.01) |
| B62B 3/02 | (2006.01) |
| B62B 5/08 | (2006.01) |

(Continued)

(52) U.S. Cl.
CPC ............... B62B 9/26 (2013.01); B62B 1/002 (2013.01); B62B 3/027 (2013.01); B62B 5/082 (2013.01); B62B 7/02 (2013.01); B62B 7/08 (2013.01); B62B 7/123 (2013.01); B62B 5/065 (2013.01)

(58) Field of Classification Search
USPC .................. 280/47.24, 47.18, DIG. 6, 47.17, 280/47.131, 47.25, 47.26, 47.2
See application file for complete search history.

(56) References Cited

U.S. PATENT DOCUMENTS 4,257,729 A    3/1981    Morissette
4,681,330 A *  7/1987    Misawa ....................... 280/47.2
(Continued)

FOREIGN PATENT DOCUMENTS

DE    3832581    3/1990
DE    29910609    10/1999
(Continued)

OTHER PUBLICATIONS

International Search Report, PCT/NO02/00382, Jan. 20, 2003.
(Continued)

*Primary Examiner* — Katy M Ebner
(74) *Attorney, Agent, or Firm* — Kolisch Hartwell, P.C.

(57) ABSTRACT

The invention comprises a trolley with an frame (1) with wheels (10, 11) and at least one handle (5), which is characterized in that the frame (1) comprises: a main supporting rod (2), equipped with the handle (5) at the upper end, and at least one wheel (11) at the lower end; a sub-supporting rod (7), fastened at its upper end to the main supporting rod (2) between the extreme ends of the main supporting rod, and equipped with at least one wheel (10) at the lower end; and wherein the wheels (11) are fastened to the main supporting rod via a first crosspiece (4) and/or where the wheels (10) are fastened to the sub-supporting rod via a second crosspiece (9).

10 Claims, 14 Drawing Sheets (51) Int. Cl.
*B62B 7/02* (2006.01)
*B62B 7/08* (2006.01)
*B62B 7/12* (2006.01)
*B62B 5/06* (2006.01)

(56) References Cited

U.S. PATENT DOCUMENTS

| | | | |
|---|---|---|---|
| 4,953,667 A | | 9/1990 | Bigo |
| 5,685,552 A | * | 11/1997 | Osaki ................ 280/47.24 |
| 5,984,326 A | * | 11/1999 | Abraham et al. ........ 280/47.2 |
| 6,168,174 B1 | * | 1/2001 | MacDougall ............ 280/47.34 |
| 6,203,053 B1 | * | 3/2001 | Sohrt et al. ............ 280/641 |
| 6,209,892 B1 | * | 4/2001 | Schaaf et al. ........ 280/33.993 |
| 6,296,260 B1 | * | 10/2001 | Schiavone .............. 280/47.2 |

FOREIGN PATENT DOCUMENTS

| | | | | |
|---|---|---|---|---|
| DE | 20019137 | | 2/2001 | |
| EP | 0 864480 | | 3/1998 | |
| EP | 0 939019 | | 2/1999 | |
| FR | 2625718 A1 | * | 7/1989 | ......... B62B 3/10 |
| JP | 49-116758 | | 10/1974 | |
| JP | 54-83759 | | 6/1979 | |
| JP | 54-128246 | | 9/1979 | |
| JP | 56-119766 | | 9/1981 | |
| JP | 63-67376 | | 5/1988 | |
| KR | 20-1998-010506 | | 5/1998 | |
| WO | WO85/03045 | | 7/1985 | |

OTHER PUBLICATIONS

Official Gazette of Japanese Utility Model Publication No. Sho 46-13391 dated May 13, 1971.
Official Gazette of Japanese Laid-Open Patent Publication No. Sho 53-30552 dated Mar. 22, 1978.
Abstract of Japanese Laid-Open Patent Publication No. Hei 11-165638 dated Jun. 20, 1999.
Abstract of Japanese Laid-Open Patent Publication No. Hei 11-165639 dated Jun. 22, 1999.
Abstract of Japanese Laid-Open Patent Publication No. 11-291917 dated Oct. 26, 1999.
Abstract of Japanese Laid-Open Patent Publication No. 2000-001169 dated Jan. 7, 2000.
Abstract of Japanese Laid-Open Patent Publication No. 2000-142409 dated May 23, 2000.
Abstract of Japanese Laid-Open Patent Publication No. 2000-219101 dated Aug. 8, 2000.
Abstract of Japanese Laid-Open Patent Publication No. 2001-088712 dated Apr. 3, 2001.
Abstract of Japanese Laid-Open Patent Publication No. 2001-224642 dated Aug. 21, 2001.

\* cited by examiner

TROLLEY

BACKGROUND OF THE INVENTION

The present invention relates to a trolley, preferably a collapsible trolley which may be used as a trolley for children and/or shopping.

STATE OF THE ART

Many types of trolleys for children, with the possibility of storing luggage such as shopping goods, are known from prior art. The goods or luggage holder is usually placed behind the back of the seat or under the seat, and consists of a basket or net in a hard or soft material. A problem with such storage baskets is that the goods or luggage must often be removed from the trolley before it can be collapsed. This is impractical when taking the trolley on public transport such as on a bus, tram or train, but also if the trolley is to be placed in the boot of a car. Furthermore, these trolleys are seldom very practical as shopping trolleys or luggage trolleys alone, as the whole trolley must be completely opened including the seat, and may therefore not be manoeuvred and handled with the same degree of ease, as is possible with a simple, conventional two-wheeled hand-trolley.

In U.S. Pat. No. 5,290,049, this is attempted solved by a collapsible trolley in which the luggage holder is simultaneously kept intact. The problem with this solution is that all of the many trolley parts, such as the seat and several rods, with their dimension and weight, are always fastened to the trolley. This reduces the possibilities to collapse the trolley into an effectively reduced size, and it is impracticable to carry all of the parts when the trolley will only be used as a shopping trolley.

Furthermore, the luggage holder is permanently mounted onto the rest of the trolley. It will thus be difficult to take necessary care of the goods which, for example need to stand upright during transport, or which must not be squeezed by other goods, as the trolley cannot necessarily be stored upright with the aforementioned modes of transport.

There is consequently a need for a trolley which may be used both as a children's trolley and/or as a shopping trolley, and which has a simple and lightweight construction, where the necessary units may be simply adapted to the usage by being assembled or disassembled.

THE OBJECT OF THE INVENTION

The object of the invention is to provide a trolley which solves the aforementioned problems, and which is free of the shortcomings that earlier solutions had. Further, it is the object to provide a trolley with a lightweight and simple construction, which has many possible uses and capability of variation, and which is easy to collapse for transportation and for storage in one or several pieces.

SHORT DESCRIPTION OF THE INVENTION

The object of the invention is attained by a trolley as defined in the patent claims, which comprises a frame with wheels and at least one handle, characterised in that the frame comprises:
one main supporting rod, equipped with a handle at the upper end and a least one wheel at the lower end;
one sub-supporting rod, fastened at its upper end to the main supporting rod between the extreme ends of the main supporting rod, and equipped with at least one wheel in the lower end; and
where the wheels are fastened to the main supporting rod by one first crosspiece and/or where the wheels are fastened to the sub-supporting rod by a second crosspiece.

The trolley may advantageously comprise one or several detachable and height-controllable modules such as a luggage holder, a fastening bracket and/or a seat.

DESCRIPTION OF EMBODIMENTS

Figure 1:
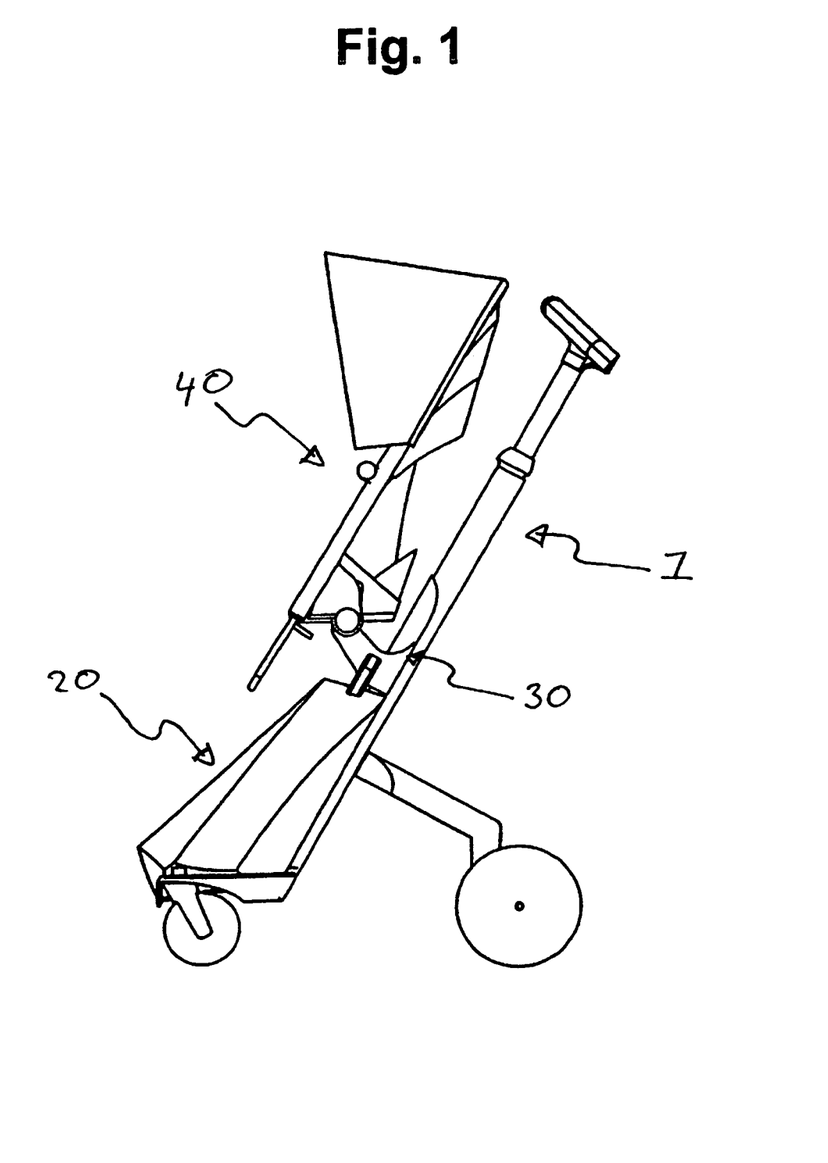
FIG. 1 shows a side view of the trolley according to the invention in an expanded state with luggage holder, fastening bracket and seat with a rain/sun cover.

The trolley according to the invention has a frame 1 onto which different modules such as a luggage holder 20, fastening bracket 30, and child seat 40 may be fastened as shown in FIG. 1.

Figure 2:
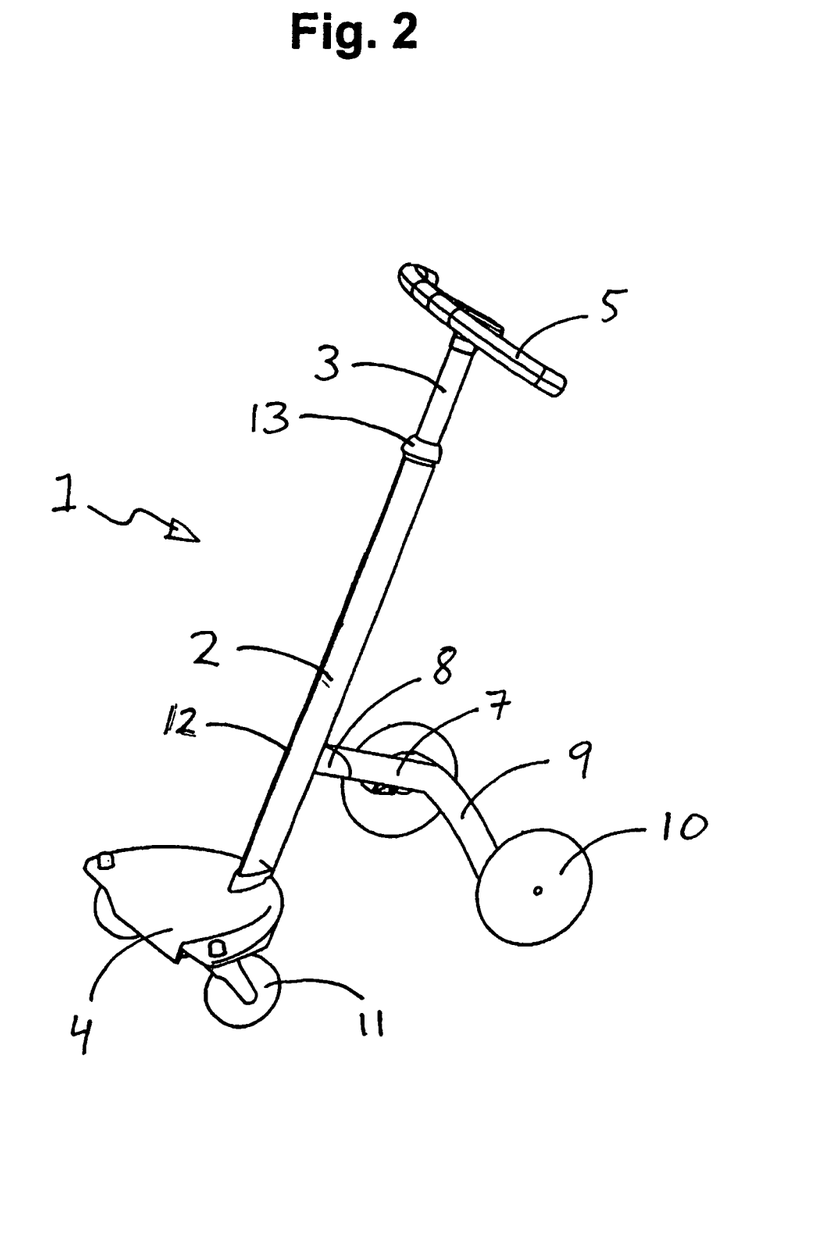
FIG. 2 shows a perspective view of the frame of the trolley depicted in FIG. 1.

The frame 1 of the trolley, as shown in FIG. 2, consists of a main supporting rod 2 with a first crosspiece 4 in the form of a platform with wheels 11 at the bottom end and a handle 5 at the upper end. The frame 1 further consists of a sub-supporting rod 7 which in its upper end is fastened via a joint 8 to the main supporting rod 2, between its extreme ends. The sub-supporting rod 7 has a second crosspiece 9 in the form of an arched axle at the lower end, with wheels 10 in the end parts. The frame 1 is preferably made of a lightweight and strong material such as aluminium.

The main supporting rod 2 has preferably a sliding track 12 for fastening of and height control of different modules, as mentioned above.

The platform 4 may be used for standing on, or may function as a footrest. In this embodiment the platform 4 has a semicircle form where the two corners are equipped with wheels 11 on the underside which preferably have a rotatable suspension. The platform 4 is attached to the end of the main supporting rod 2 in the symmetrical middle of the semicircle arc, so that the angle between platform 4 plane and the main supporting rod 2, is more than 90 degrees. Alternatively, the platform 4 may be equipped with a wheel in the circle of the arcs' symmetrical plane, with associated track or raised part in platform 4. The platform 4 may possibly have another form such as a trapezoid form or a triangular form, and should be equipped with an anti-slip pattern or coating. Alternatively, the platform may be detachable, fastened to the main supporting rod 2 or its sliding track 12, or resting on another crosspiece such as an axle where the wheels 11 may be mounted.

Figure 3:
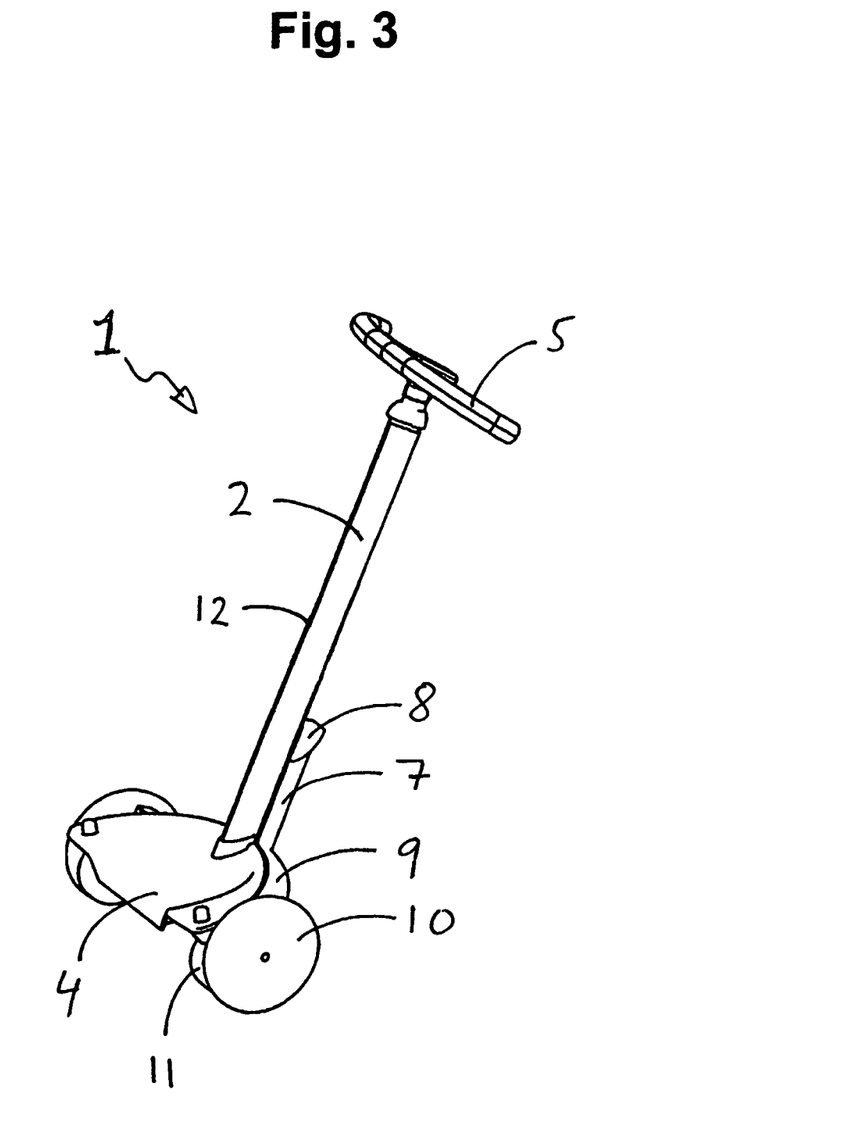
FIG. 3 shows the frame depicted in FIG. 2, in a collapsed state.
Figure 10:
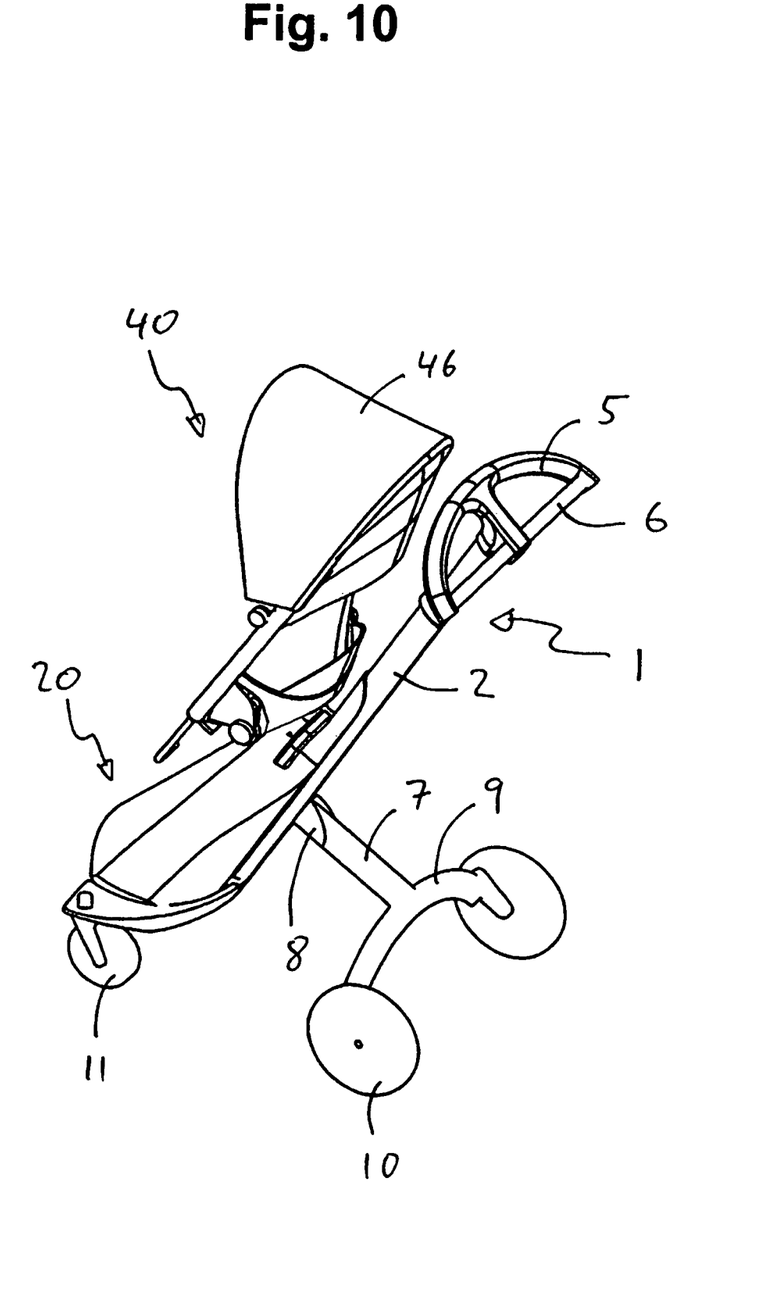
FIG. 10 shows a perspective picture of the trolley depicted in FIG. 9, seen from behind.

The handle 5 is fastened to the main supporting rod 2 with a telescopic extension 3. In this way, the height of handle 5 may be adjusted according to the user's height, and locked in suitable height with the locking sleeve 13 which may be a tightening bushing. When storing or transporting the trolley, the extension 3 may be pushed all the way down to the main supporting rod 2 as shown in FIG. 3. The handle has, in this embodiment, a rod fastened to the middle of an arched crosspiece in one end, such that the rod lies in the plane of the crosspiece, and the rods free-ends are fastened to the end of the extension 3, approximately perpendicular to this. Further, the handle 5 may be equipped with a strap 6 between the ends of the crosspiece and the rods free ends, or between the ends of the crosspieces, which may be used to carry the trolley over a persons shoulder (the straps 6 are shown in FIG. 10). This makes it possible to carry the trolley in difficult terrain such as stairs, and it frees the other arm which makes it possible to, for example, carry a small child at the same time. The handle 5 may be detachable fastened to the extension 3, or may be tilting to reduce the trolleys dimensions. The handle may, for example, be produced in plastic, aluminium or steel and should have a coating on the gripping surfaces which provide a good grip, and which insulates. A wide variation in design of the handle is possible.

The sub-supporting rod 7 may, from the open position as is shown in FIG. 2, be folded along the main supporting rod 2 as shown in FIG. 3, since the joint 8 allows rotation of the sub-supporting rod 7 in the plane of symmetry through the main supporting rod 2 and the platform 4. The joint 8 may lock the sub-supporting rod 7 in these two extreme positions, by an adjusting screw for example. A further possibility is that the joint 8 may be loosened from its locked position, with the help of a disengaging apparatus placed by the locking bushing 13 (not shown). The sub-supporting rod 7 if preferably equipped with an arched axle 9 which prevents the user from touching axle 9 with their foot when walking normally, when the sub-supporting rod 7 is open. The size and arched form of axle 9 are such that it fits around and under the platform 4 when the sub-supporting rod 7 is folded close to the main supporting rod 2. The axle 9 has wheels 10 attached to its extreme ends, such that the wheels 10 in this position lay outside and almost in line with the wheels 10 of the platform 4.

Alternatively, the sub-supporting rod 7 and the axle 9 may together constitute an inverted Y-form, an inverted V-form or two separate legs. The attachment to the main supporting rod may be via joint 8 or directly on main supporting rod 2 to fulfill the same functions.

The wheels 10 attached to the axle 9 are preferably of spring suspension. The suspension may alternatively be achieved by suspension in the fixing of the axle 9 to the sub-supporting rod 7 or in the fixing of platform 4 to the main supporting rod 2. From a security point of view, the wheels 10 must also be lockable or equipped with a brake. Locking may be performed by a spring-loaded rod or brake-block against the wheel, or an ordinary bolt-lock. The locking mechanism may possibly be disengaged by a central pedal placed in the fixing point between the sub-supporting rod 7 and the axle 9 (not shown). All the wheels 10, 11 are preferably lightweight and of a size adjusted to the terrain. The wheels 10, 11 may easily be changed to replace damaged wheels or adjusted to the use of the trolley under different conditions, such as more rough terrain where relatively broad, air filled wheels may be useful, or to change the appearance of the trolley.

In an alternative embodiment, one wheel 10, 11 can be mounted directly on the lower part of the main supporting rod 2 or the sub-supporting rod 7, or the extension of these without using a crosspiece so that the main supporting rod 2 or the sub-supporting rod 7 functions as a wheel fork. Alternatively, two wheels 10, 11 may be mounted in parallel directly on each side of the main supporting rods 2 or the sub-supporting rods 7 lower part with approximately the same function. Such centrally placed wheels may preferably be equipped with a brake, such as a brake-block or disc brake.

For use in cold environments, one or both sets of wheels may be interchanged with small skiis or runners for use on snow or ice.

The modules as mentioned above, work together with the main supporting rod 2 in that they may be fastened to the main supporting rod 2 or the slider track 12. The interlocking parts are equipped with fastening parts or equipped with fastening means, e.g. clamping means or click-locks which clamp around the main supporting rod and hold the modules in place by friction or the screwing means which may lock the modules in different height positions. Alternatively, a hole/tap system may be used for fastening in different heights on the main supporting rod 2.

Figure 4:
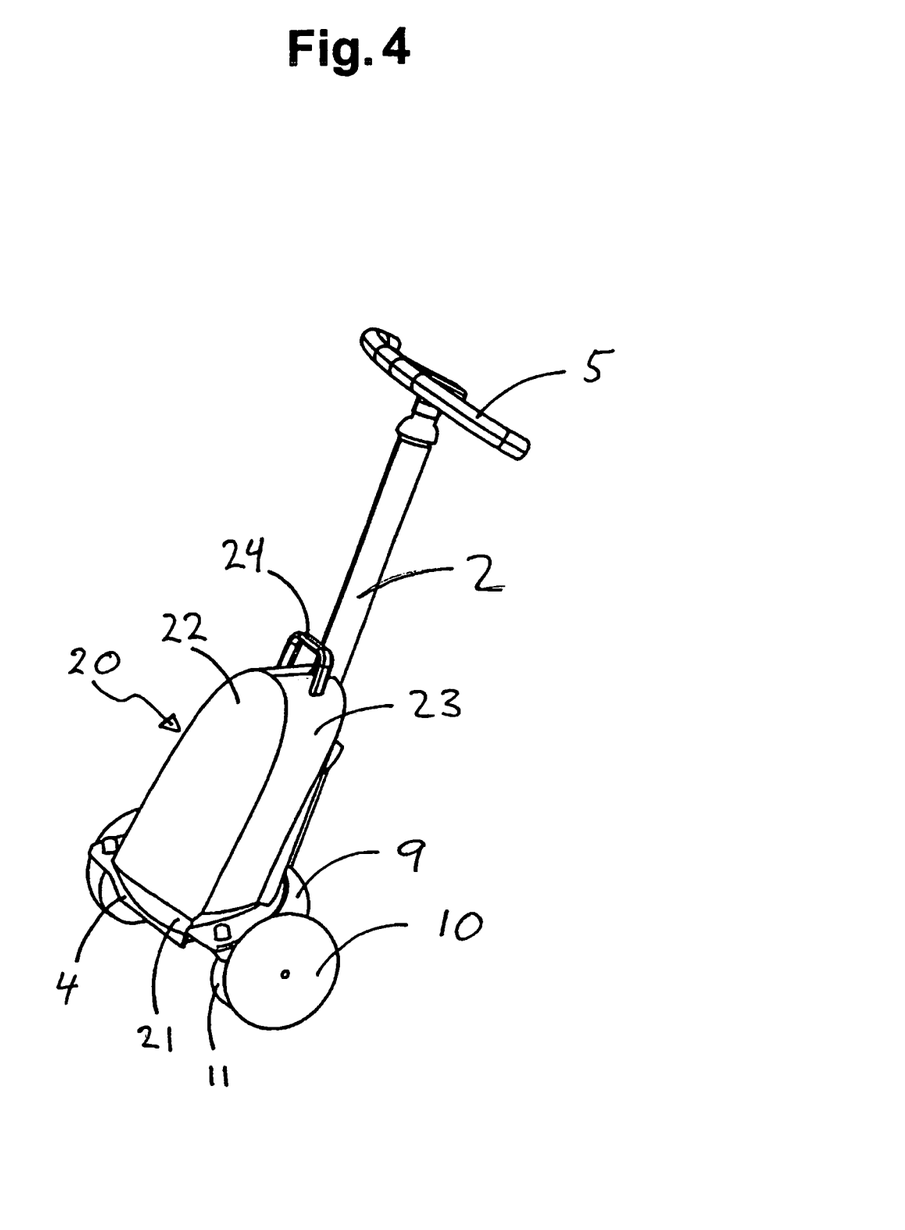
FIG. 4 shows the frame depicted in FIG. 3, with a luggage holder.

The luggage holder 20 is shown in FIG. 4 as snapped onto the main supporting rod 2 and rests alternatively on the platform 4. The luggage holder 20 may have different embodiments in varying size, material quality, colour etc. The luggage holder 20 has in this embodiment, a firm or semi-firm supporting back and base 21, preferably made in plastic. The front consists of a lid 22 which is closable by a zip to the sides 23, both parts may be made in fabric or soft plastic. At the top of the luggage holder 20 a handle 24 is fastened for lifting the luggage trolley or only the luggage holder 20, when this is not attached to the frame 1. Alternatively, the luggage holder 20 may comprise shoulder strap(s) for carrying over the shoulder or on the back.

In this embodiment, the trolley may be used as a simple and practical shopping trolley that one may pull behind oneself. The handle 5 may be adjusted in the desired length but will preferably be in the lower position to reduce the size. Other types of luggage holders 20 with different design and size may alternatively be fastened in the same way as e.g. a golf bag. Alternatively, more luggage holders may be fastened on top of each other (not shown), or the luggage holder may be fastened on the opposite side of the main supporting rod (shown in FIG. 12).

Figure 5:
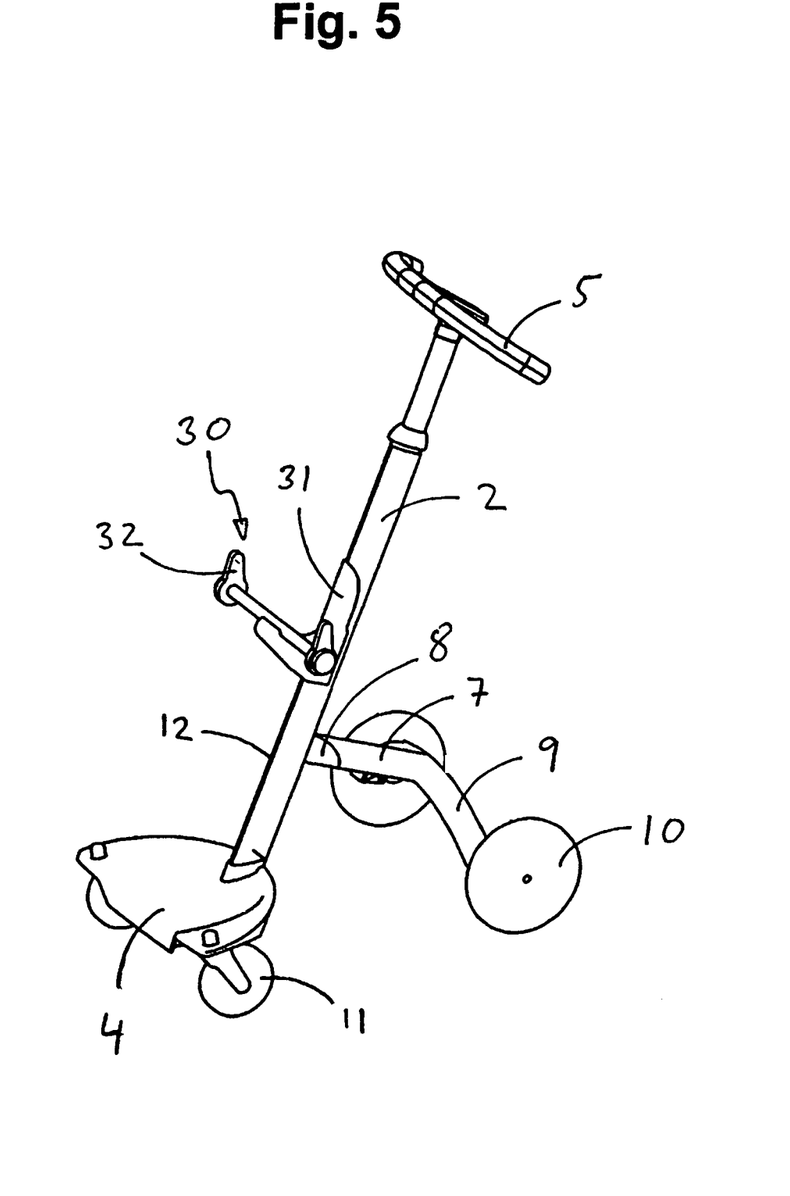
FIG. 5 shows the frame depicted in FIG. 2, with a fastening bracket.

A fastening bracket 30 as shown in FIG. 5 may alternatively be used for fastening several modules such as a children's seat 40. The fastening bracket 30 has an armature 31 which cooperates with the sliding track 12 on the main supporting rod, and makes it possible to adjust the height of the modules. With the help of the rotatable fastenings 32 of the fastening bracket 30, the modules may be rotated.

Figure 6:
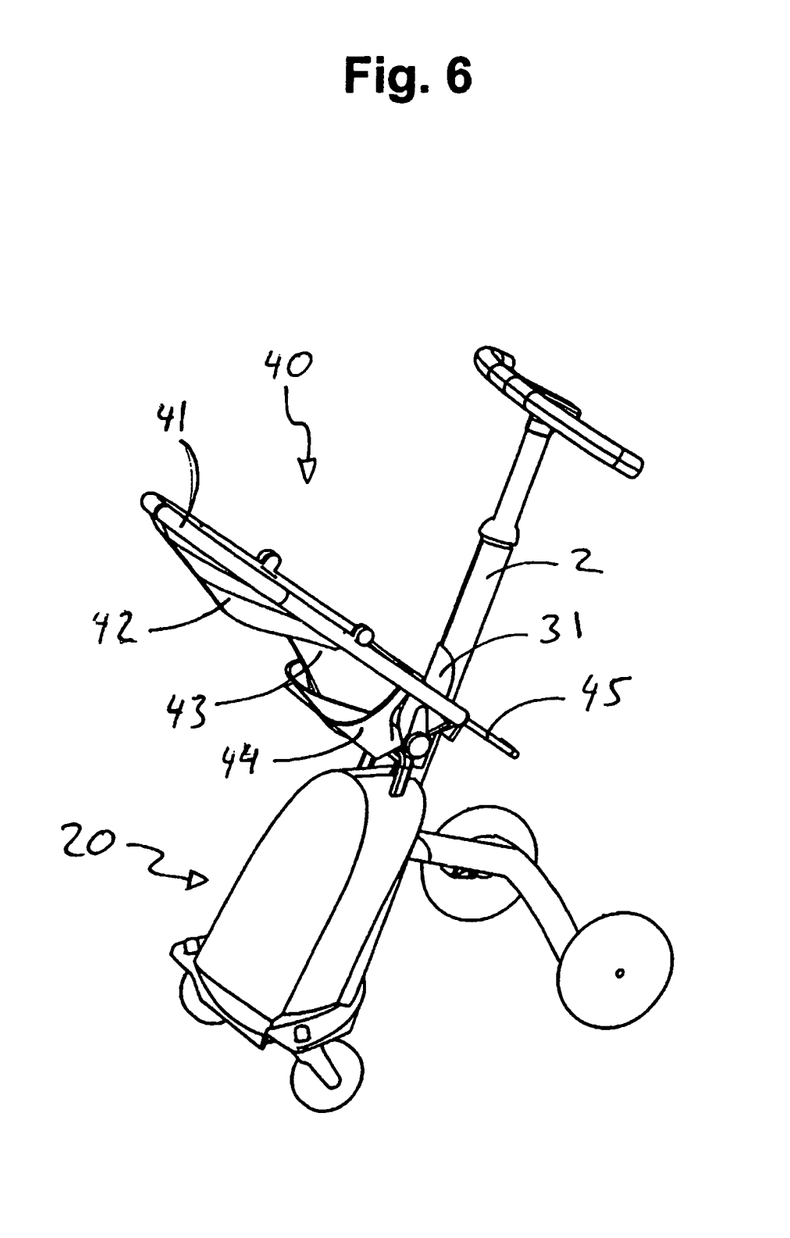
FIG. 6 shows a perspective view of the trolley depicted in FIG. 1, with a luggage holder, fastening bracket and seat turned against the handle in a sitting position.
Figure 7:
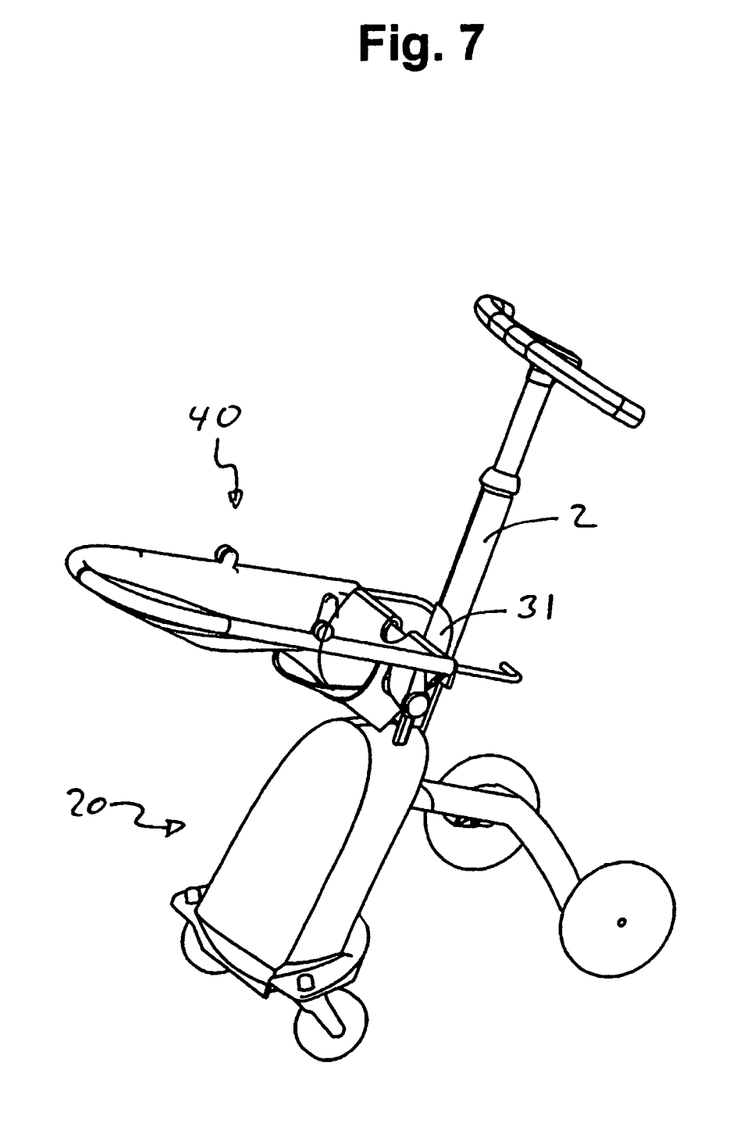
FIG. 7 shows the trolley depicted in FIG. 6, with the seat in sleeping position.
Figure 8:
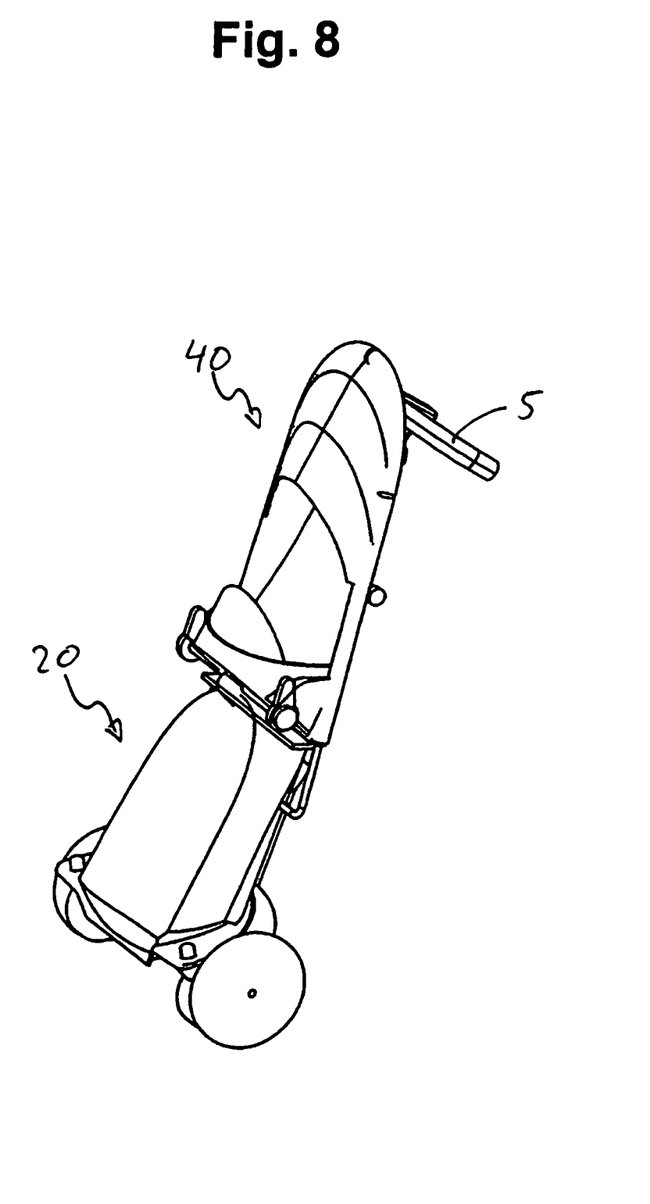
FIG. 8 shows the trolley depicted in FIG. 6, in a collapsed state.

A children seat 40 is shown mounted with the fastening bracket 30 in FIG. 6. The seat 40 is, in this Figure, mounted against the main supporting rod 2, which is suitable for babies who the user wants to keep a watch over. The seat 40 consists of a U-frame 41 with a stiff head-protecting area 42 in the upper rounded part, a stiff seating part 44 in the open part of the U-frame 41, and a soft backrest 43 stretched between these. The seat has preferably footrests 45 as telescopic extensions of the U-frame 41. With the help of a fastening bracketing 30 the seat 40 may be rotated into a sleeping position, as shown in FIG. 7, or be folded toward the main supporting rod 2 as shown in FIG. 8, during storage or transport. The luggage holder 20 may, under all these operations, be fastened to the main supporting rod 2 as shown in the FIGS. 6-8 mentioned above, and may be easily operated. The seat 40 should be equipped with a conventional baby-harness. The child seat 40 may alternatively be a child car-seat.

Figure 9:
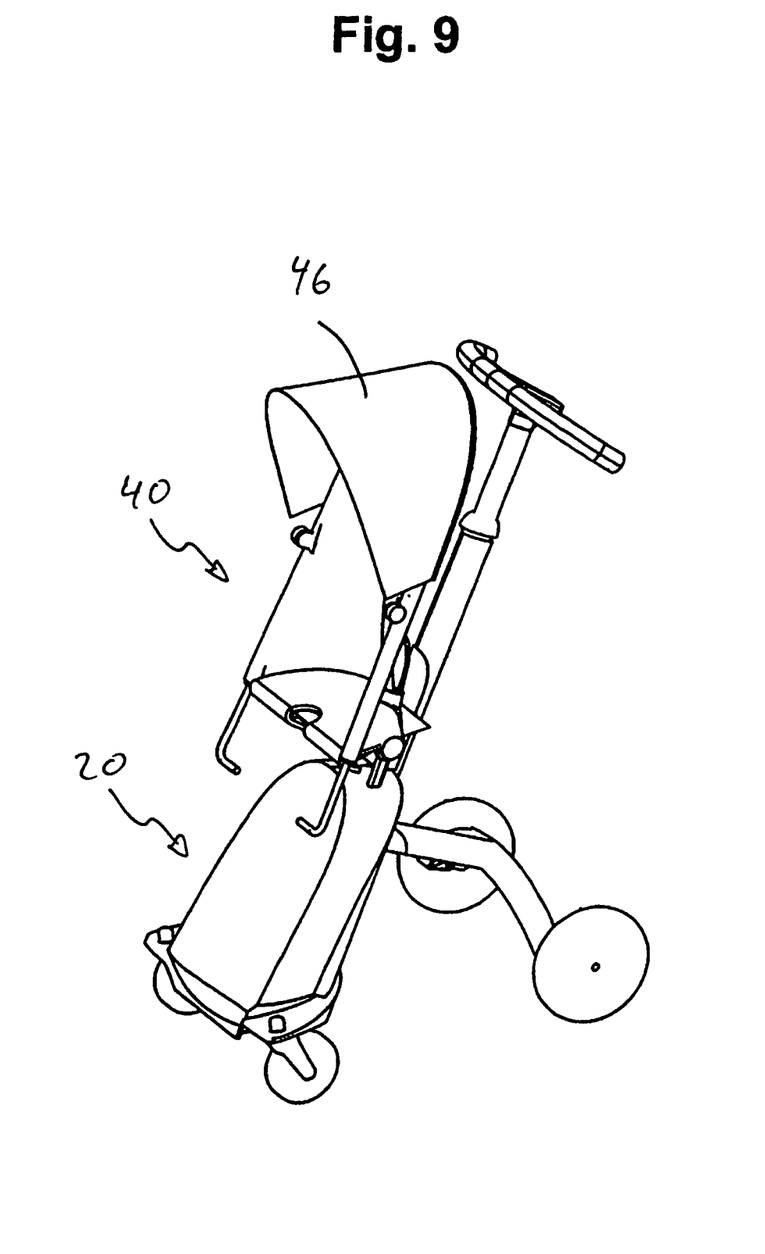
FIG. 9 shows a perspective picture of the trolley, depicted in FIG. 1.
Figure 11:
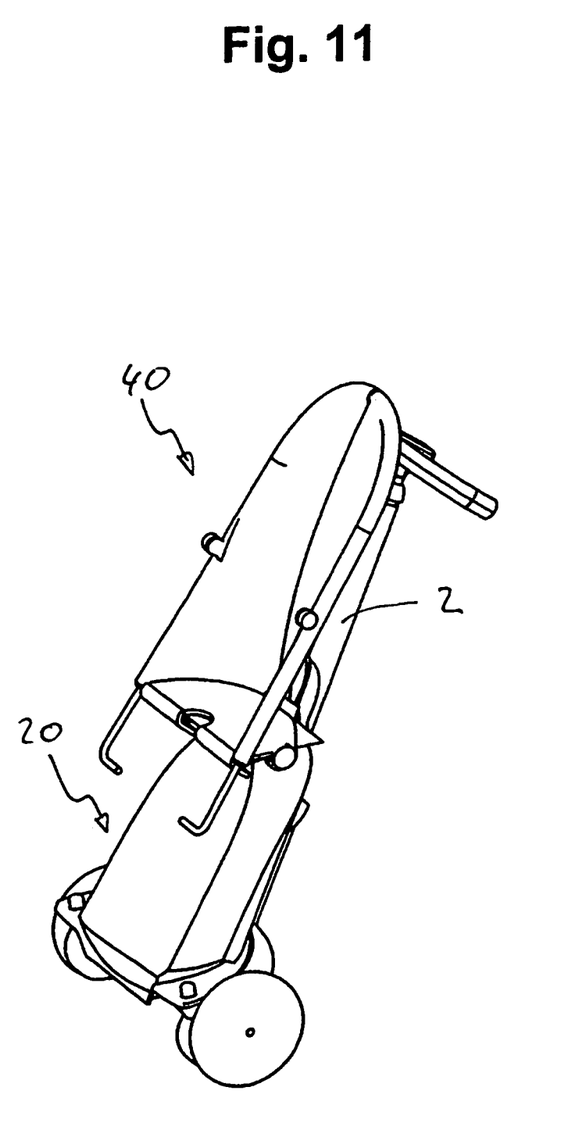
FIG. 11 shows the trolley in FIG. 10, in a collapsed state.

The seat 40 may also be fastened to the fastening bracket 30 turned away from the main supporting rod 2 as shown in FIG. 9, and may alternatively comprise a sun/rain screen 46. This direction is suitable for small children who like to look around, and the seat 40 in this position may not be folded down into a sleeping position, because of the main supporting rod 2 as is evident from the FIG. 10. In order to reduce the dimensions of the trolley during storage or transport, the fastening bracketing 30 and the seat 40 may be pushed down to the luggage holder, the seat 40 may be folded as close to the main supporting rod 2 as possible, the extension 3 may be pushed down in the main supporting rod 2 and the sub-supporting rod 7 folded towards the main supporting rod 2 as shown in FIG. 11. Thereby, a relatively short and flat trolley which is easy to transport is achieved, and which may still be wheeled in both directions.

Figure 12:
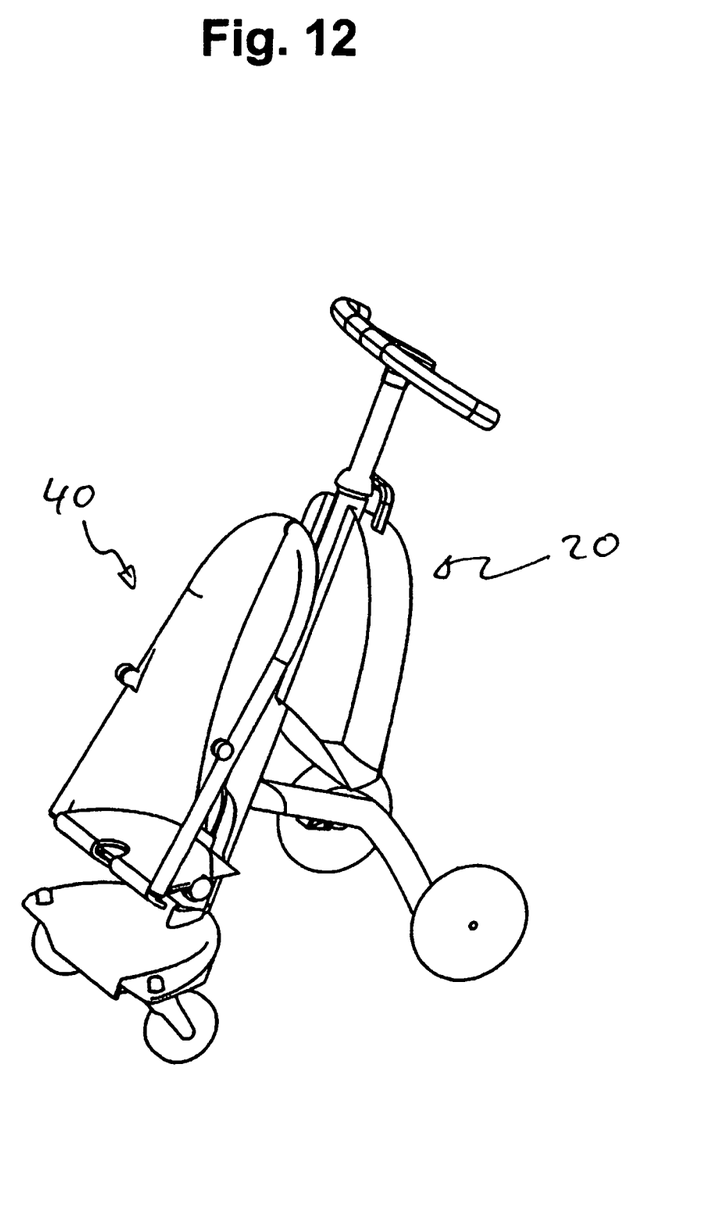
FIG. 12 shows a perspective picture of the trolley depicted in FIG. 1, in an alternative configuration.

For older children who like to walk a bit on their own, the fastening bracket 30 with seat 40 turned from the main supporting rod 2 are pushed all the way down to platform 4, as shown in FIG. 12. In this embodiment the platform 4 functions as a footrest and the seat height may be adjusted to suit the child. The luggage holder 20 may be snapped-on to the opposite side of the main supporting rod 2, and operated from there.

Figure 13:
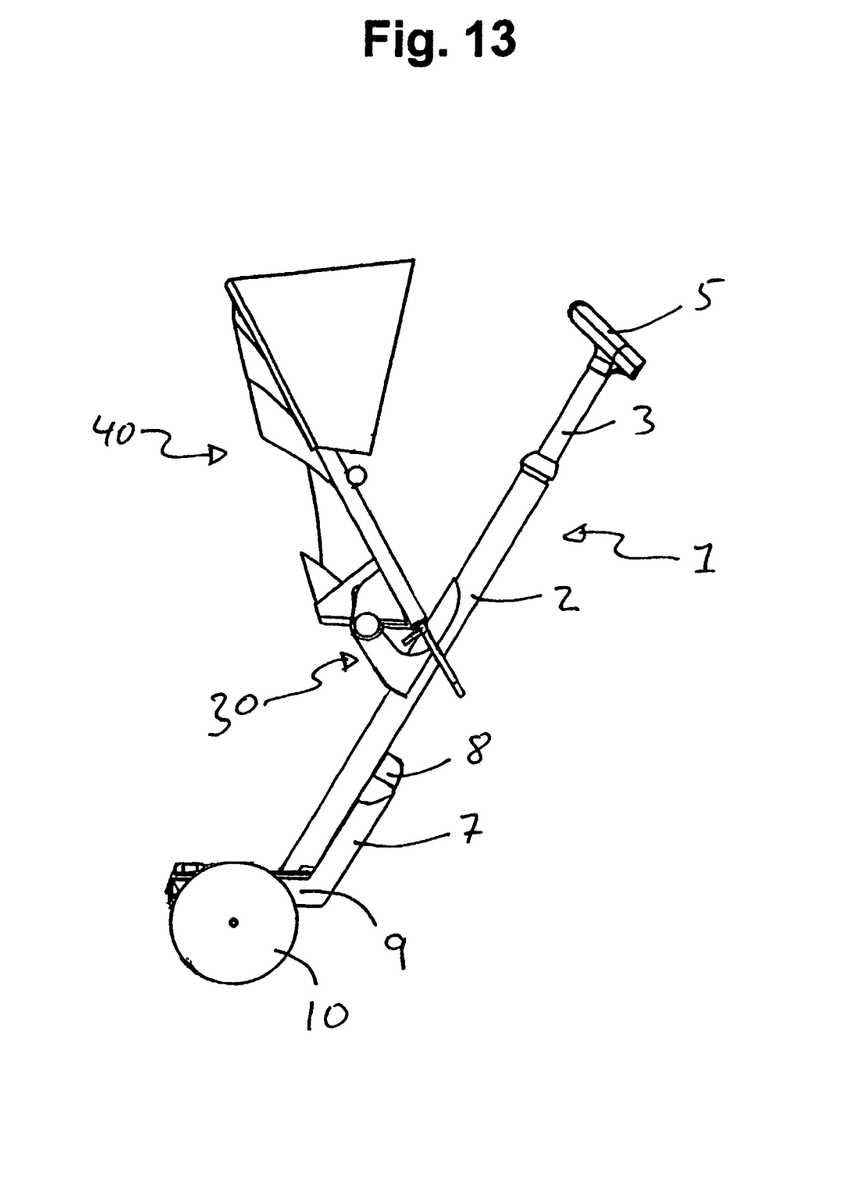
FIG. 13 shows a side view of the trolley depicted in FIG. 6, in an alternative configuration.

In an alternative embodiment as shown in FIG. 13, the seat 40 may be mounted against the main supporting rod 2, to be used for the storage of luggage or goods, and the luggage holder 20 may be omitted to provide room on platform 4, where an older child may stand. The seat 40 or the fastening bracket 30 may contain a handle which the child may hold on to when it is standing on the platform 4, or contain fastening means for one or several such handles (not shown). The sub-supporting rod 7 is in this embodiment folded together but may also be folded up and the seat 40 may then, for example be used for a baby.

Figure 14:
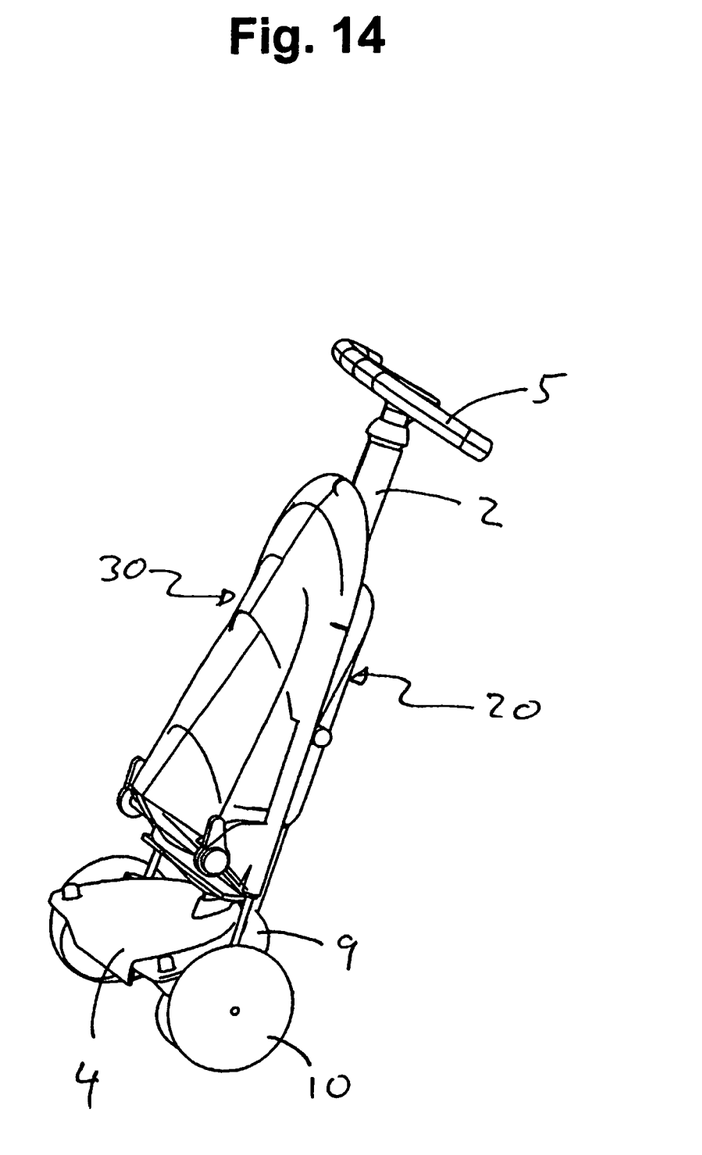
FIG. 14 shows a perspective picture of the trolley depicted in FIG. 6 in an alternative configuration.

To reduce the dimensions of the trolley and the modules by as much as possible, the fastening bracket 30 and the seat 40 are pushed down to the platform 4, the luggage holder 20 may be placed in the seat 40 which is directed towards the main supporting rod 2, and which in turn is folded as close to the main supporting rod 2 as possible. When the handle 5 in addition is pushed down in the main supporting rod 2 and the sub-supporting rod 7 is folded along the main supporting rod 2 as shown in FIG. 14, the trolley is in its most compact form.

The trolley as described above, or parts thereof, may also alternatively be used as a supporting stroller, for example for persons with walking difficulties. One or more of the wheels 10, 11 should then be equipped with conventional breaking means, which may be operated from the handle 5. The luggage holder 20 may be fastened on the preferred side of the main supporting rod 2 and regulated to a suitable height.

Alternatively, may two luggage holders 20 be mounted on the main supporting rod 2 and they may alternatively take other forms, such as a basket or a net for example. Alternatively, a stronger and more simple seat designed for an adult, may be mounted directly or via the fastening bracket 30 on the main supporting rod 2, such that the user may sit and rest.

The invention claimed is:

1. A trolley for children, comprising a frame with wheels, and at least one detachable seat module the frame of the trolley comprising: a central main supporting rod; and a central sub-supporting rod, fastened at its upper end to the main supporting rod between the outer ends of the main supporting rod in a rotatable fashion directly or via a joint for rotation in the plane through the main supporting rod and the sub-supporting rod, said sub-supporting rod having a second crosspiece at the lower end, and said sub-supporting rod and second crosspiece being in one piece; wherein the trolley further comprises a handle at the upper end of the main supporting rod and a first crosspiece at the lower end of the main supporting rod, where the first crosspiece is a platform configured to support a standing child and having wheels at each extremity; wherein the second crosspiece has wheels at each extremity; and wherein the seat module is detachably fastened to the main supporting rod, alternatively by the slider track, or on the opposite side in relation to the sub-supporting rod.

2. The trolley according to claim 1, wherein the seat module is fastened to the main supporting rod alternatively by the slider track via a fastening bracket.

3. The trolley according to claim 1, wherein the seat module may be fastened to the main supporting rod, alternatively by the slider track, or by fastening the fastening bracket with the seating direction, either against or away from the main supporting rod.

4. The trolley according to claim 1, wherein the seat module is a child car-seat.

5. The trolley according to claim 1, the seat module, or a back-of-the-seat on the seat module, may be rotated and alternatively locked between two outer positions in relation to the main supporting rod.

6. The trolley according to claim 5, wherein the two outer positions include a sitting position and a sleeping position.

7. The trolley according to claim 1, wherein the seat module has a foot rest mounted in the lower edge of the sitting area.

8. The trolley according to claim 1, wherein the seat module is height adjustable.

9. A trolley for children, comprising a frame with wheels, and at least one detachable seat module the frame of the trolley comprising: a central main supporting rod; and a central sub-supporting rod, fastened at its upper end to the main supporting rod between the outer ends of the main supporting rod in a rotatable fashion directly or via a joint for rotation in the plane through the main supporting rod and the sub-supporting rod, said sub-supporting rod having a second crosspiece at the lower end, and said sub-supporting rod and second crosspiece being in one piece; wherein the trolley further comprises a handle at the upper end of the main supporting rod and a first crosspiece at the lower end of the main supporting rod, where the first crosspiece is a platform configured to support a standing child and having wheels at each extremity; wherein the second crosspiece has wheels at each extremity; and wherein the sub-supporting rod may be rotated into a folded position in which the wheels at each extremity of the sub-supporting rod lay outside the wheels at each extremity of the first crosspiece, overlapping said wheels.

10. A trolley for children, comprising a frame with wheels, and at least one detachable seat module the frame of the trolley comprising: a central main supporting rod; and a central sub-supporting rod, fastened at its upper end to the main supporting rod between the outer ends of the main supporting rod in a rotatable fashion directly or via a joint for rotation in the plane through the main supporting rod and the sub-supporting rod, said sub-supporting rod having a second crosspiece at the lower end, and said sub-supporting rod and second crosspiece being in one piece; wherein the trolley further comprises a handle at the upper end of the main supporting rod and a first crosspiece at the lower end of the main supporting rod, where the first crosspiece is a platform configured to support a standing child and having wheels at each extremity; wherein the second crosspiece has wheels at each extremity; and wherein the sub-supporting rod may be rotated into a folded position in which the wheels of the sub-supporting rod overlap the wheels of the main supporting rod, and wherein the trolley is configured to support a child in the seat module in either of the folded or unfolded positions.

* * * * *